United States Patent [19]

Hsia

[11] Patent Number: 4,511,519
[45] Date of Patent: Apr. 16, 1985

[54] TOWER PACKING ELEMENTS

[75] Inventor: Min A. Hsia, Kent, Ohio

[73] Assignee: Norton Company, Worcester, Mass.

[21] Appl. No.: 605,044

[22] Filed: Apr. 30, 1984

[51] Int. Cl.³ .............................................. B01F 3/04
[52] U.S. Cl. ....................................... 261/94; D23/4;
55/90; 55/233; 202/158; 210/150; 261/DIG. 72
[58] Field of Search ....................................... 261/94–98,
261/111, 112, DIG. 72; 210/150, 151; 165/60;
202/158; 422/310; D23/3, 4; 55/90, 233

[56] References Cited

U.S. PATENT DOCUMENTS

| D. 243,531 | 3/1977 | Strigle, Jr. | D23/4 |
|---|---|---|---|
| 1,307,635 | 6/1919 | Nielsen | 261/95 |
| 2,591,497 | 4/1952 | Berl | 261/95 |
| 3,506,248 | 4/1970 | Starbuck et al. | 261/94 |
| 3,914,351 | 10/1975 | McKeown et al. | 261/98 |
| 4,067,936 | 1/1978 | Ellis et al. | 261/98 |
| 4,122,011 | 10/1978 | Strigle, Jr. | 210/150 |
| 4,195,043 | 3/1980 | Foote et al. | 261/94 |
| 4,385,988 | 5/1983 | Hypponen | 210/150 |

FOREIGN PATENT DOCUMENTS 1430233  3/1976  United Kingdom ....... 261/DIG. 72

*Primary Examiner*—Richard L. Chiesa
*Attorney, Agent, or Firm*—Walter Fred

[57] ABSTRACT

A randomly dumpable self orienting or orderly stackable hollow or cellular plastic packing elements of uniformly distributed high surface area and open cells comprised of adjacent first and second hollow triangular structures angularly displaced 60° relative to one another about a central axis each including inclined structural side members connected together at apexes of the triangular structure and at crossing portions of the inclined structural members of the first and second triangular structure. Each of the inclined structural side members of each triangular structure is connected to a radial structural member of a Y-shape structure located on the adjacent outer side of each of the first and second triangular structures and interconnected by a central hub about the central axis of the packing element. Angular shape structural members interconnect the radial structural members of the Y-shape structure on each side to the inclined structural side member of a triangular member on each opposite side of the packing element. The packing element may be provided with a number of short drip fingers or members extending from or crossing the inclined structural side member of the triangular structure and the radial structural member of the Y-shape structure to drip ends situated within open ended uniformly distributed cells of the packing element resulting from the equal angular displacement of the structural members about the central axis. A further embodiment includes an outer rim extending around and connected to the ends of the inclined structural side members at the apexes of the triangular structures. As a result, no two structural members of the packing element are ever in the same axial plane and the structural members are interconnected and situated at an angle to each other and thereby increase the rigidity and strength of the packing element.

19 Claims, 12 Drawing Figures

TOWER PACKING ELEMENTS

TECHNICAL DISCLOSURE

The invention relates to plastic tower packing elements of high efficiency, high surface area and high void area for fluid-fluid, liquid-liquid and liquid-gas contact apparatuses in which a number of the packing elements may either be stacked in an orderly fashion or randomly dumped and orient themselves horizontally to provide one or more packed beds thereof of high efficientcy and low pressure drop at various flow rates.

BACKGROUND OF THE INVENTION

1. Field of Invention

The invention relates to packing media and particularly to hollow open ended plastic packing elements for fluid-fluid and liquid-gas contact apparatus.

2. Description of the Prior Art

Heretofore, various forms and sizes of packing elements which may be orderly stacked or randomly dumped and are self orienting have been proposed for mass transfer between two counter flowing fluids such as a liquid and a gas and through which the liquid flows by gravity and contacted by the upwardly flowing gas.

Such plastic packing elements are disclosed in U.S Pat. Nos. 3,506,248; 3,914,351; 4,122,011 and 4,195,043.

In many industrial applications, it is necessary to provide large fluid-fluid interfacial area, as well as adequate agitation in both phases, to facilitate mass transfer and/or heat transfer operations. Vessels with high-void packings are commonly used to accomplish such fluid-fluid contact and packed bed adsorption or distillation towers are examples of gas-liquid contact devices.

For efficient operation of heat and/or mass transfer in a manufacturing/processing environment, gas and liquid are usually brought into contact with each other in a counter-current fashion, with liquid flowing downward and gas flowing upward in the packed bed. Packings may have either an ordered or random geometrical arrangement. The random packings are most popular due to their low cost and the ease of installation. A random packing is composed of large numbers of individual packing elements, which are randomly dumped into a vessel to form a packing structure.

"Packing Element" is the preferred term for identical individual structural parts, from which a packed bed can be formed. The present invention contemplates designs of packing elements which will when randomly dumped or orderly stacked to form a packed bed, provide better fluid-fluid contact than the packed beds made of prior art packing elements.

In a high-void structural packing, the mechanisms of liquid flow is interstice intermittent surface-droplet flow at low liquid flow rate, gradually becomes interstice continuous-rivulet flow at moderate liquid flow rate, and finally becomes film/dripping flow at high liquid flow rate. The number of interstices per unit volume strongly influences the liquid hold up, liquid phase mixing rate, as well as gas-liquid interfacial area. In the prior art random packings, the interstices are formed by packing element-to-packing element contacts. In the present invention, the number density of interstices is greatly increased by designing interstices into packing elements. Those intra-element interstices have the same function as inter-element interstices.

SUMMARY OF THE INVENTION

Injection molded hollow plastic packing elements for orderly stacking or random dumping thereof into gas-liquid or liquid-liquid contact apparatus comprises a large number of uniformly distributed interstices, crossing members and drip fingers formed by the relative position of relatively thin, narrow, straight and/or curved structural members of the packing element. The structural members are arranged in an alternative triangular fashion so that no two structural members are in the same axially oriented curved or straight plane. A six pointed star-shape hollow or cellular packing element comprises a pair of axially disposed and interconnected hollow triangular units each of which forms one-half of the packing element situated on opposite sides of a central or horizontal plane perpendicular to the central axis about which they are angularly disposed 60° relative to each other.

Each triangular unit is comprised of three relatively thin and narrow structural side members each inclined relative to each other and the central plane and extending to apexes of the triangular structure. A central Y-shape structure with three thin and narrow radial structural members equally angularly displaced around and extending radially outwardly from an end of an interconnecting central hub about the central axis, cross over and are connected to intermediate points of each of the outer inclined edges of the structural side members of the triangular unit and to drip ends situated in adjoining interstices or cells.

The Y-shaped structures attached to the triangular units, are angularly displaced 60° relative to each other, axially spaced and connected together axially by the central hub portion extending about the central axis.

Additionally thin, narrow, and straight short radial connecting members either cross between or extend radially from and connect each crossing pair of inner inclined edge portions of the structural side members of the triangular units.

Also provided are relatively thin and narrow L-shape connecting members which cross, extend between and connect intermediate outer horizontal or inclined edge portions of the structural members of the Y-shape member on each side of the packing element to intermediate inner inclined edge portions of the structural side members of the triangular unit on the opposite side of the packing element. Each L-shape connecting member has an outer inclined or horizontal leg which crosses and extends either normal to or arcuately from an intermediate portion of each structural member of the Y-shape member to an axial leg extending axially through an adjoining cell or interstice to the inner inclined edge portion of a structural side member of the triangular unit on the opposite side of the packing element.

The apexes of the triangular units may be further connected to individual short structural connecting members or preferrably to the peripheral wall of an outer rim also connected to outer ends of longer straight radial connecting members crossing in between, and connected to the crossing inner inclined edge portions of the structural side members of the triangular units and which extend to inner drip ends or edges located within intersties or cells.

A further embodiment may include short thin members or fingers extending from the sides of the longer straight radial connecting members to drip ends or edges located in adjacent cells of the packing element.

The packing elements preferably have a saucer shape outline and a ratio of axial height or length to maximum transverse diametrical dimension of from 1:1 to 1:10 whereby each tends to orient itself horizontally when randomly dumped into a tower chamber.

BRIEF DESCRIPTION OF THE DRAWINGS

The accompanying drawings illustrate a part or the whole of the preferred embodiments of the hollow packing element of the invention wherein.

DESCRIPTION OF THE PREFERRED EMBODIMENT(S)

Figure 1:
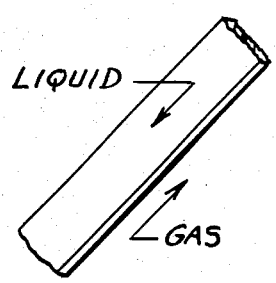
FIG. 1 is a perspective view illustrating gas-liquid flow on a structural member of a packing element.

In a liquid-gas contact packing the liquid tends to flow on the upside of a structural member of a packing element, while the gas tends to flow on the downside of the same structural member as shown in FIG. 1.

Figure 2:
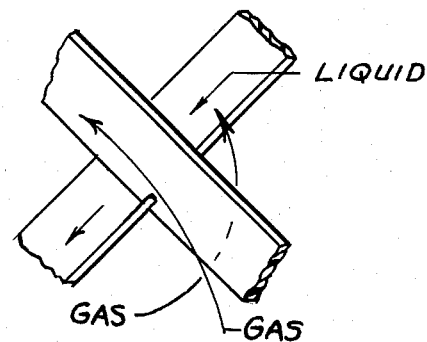
FIG. 2 is a perspective view illustrating gas-liquid cross flow on two structural members of a packing element off-set and crossing one another.

This phenomenon causes the poor contact between liquid and gas flow. In the present invention, structural members of packing elements preferably have an off-set-cross arrangement as shown in FIG. 2, so that the gas flow on a structural member cross-over the liquid flow on the other structural member.

Figure 3:
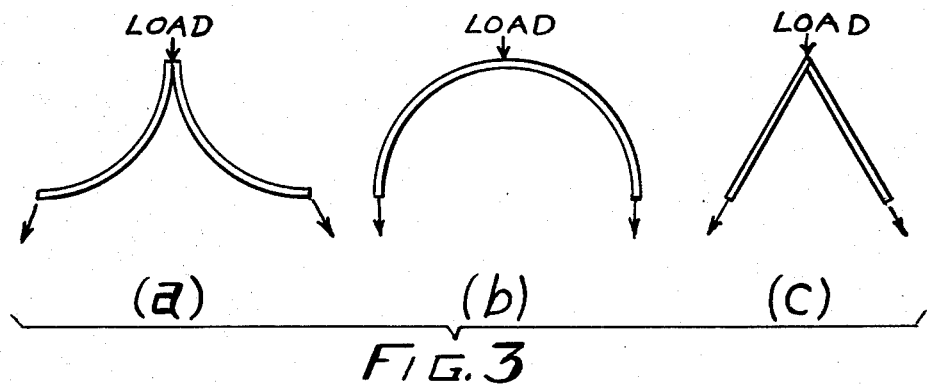
FIG. 3 (a) (b) (c) illustrate the resistance to load for inward-bending ((a), outward-bending (b), and triangularly arranged (c) structural members of a packing element.

Regarding resistance to bending under load of the packing elements, the theory of mechanical strength favors inward bending structural members as shown in FIG. 3 (a), rather than outward bending structural members as shown in FIG. 3 (b). In the design of FIG. 3 (a), both the extension and the compression strength of the construction material are properly utilized. However, the triangular arrangement of structural members, shown in FIG. 3 (c), is also a better design than arc shaped structural members from the point of view of load resistance. In the present invention, a triangular arrangement of structural members is used whenever possible, this is in sharp contrast to the circular structural members of prior art packing elements.

Nevertheless, structural members with curved surfaces induces secondary motion of fluid and also provides more tortuosity to fluid flow. The secondary fluid motion increases the rate of fluid mixing and the rate of surface renewal. Therefore, curved structural members may be used when it is probably not subjected to stress conditions. When the possibility of stress conditions exists for curved members, an attached parallel rib is recommended.

Figure 4:
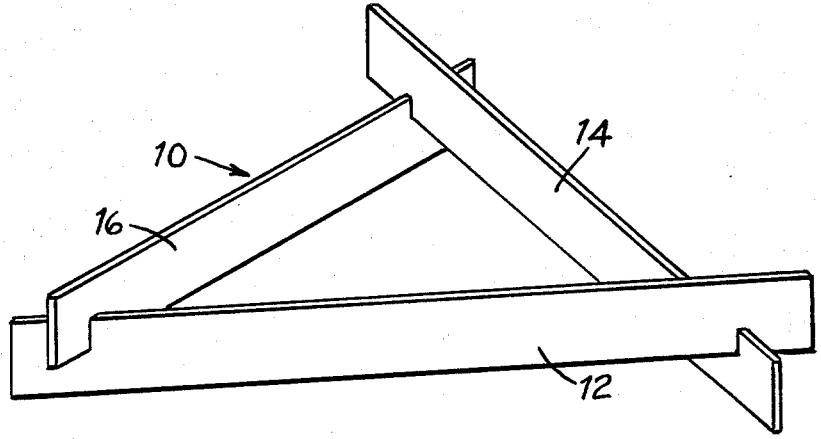
FIG. 4 is a perspective view of a hollow triangular structure comprised of three relatively inclined structural members and utilized in the construction of the packing elements of the invention.

The packing elements of the invention utilize a three dimensional triangular structure or unit 10 formed of three inclined structural side members 12, 14, and 16 as shown in FIG. 4 which effectively assures the liquid-guiding function of this triangular structure Since no more than one member can be positioned horizontally at any orientation of this triangular structure, there are always more than two inclined members functioning as liquid guides. This feature of the present invention assures the reduction and dispersion of "blind spots'- '—nonfunctional members in liquid guidance and thus helps to increase the efficiency of gas-liquid contact.

For straight members or channels of various cross-sectional geometry, those of equilateral triangular cross-section have the lowest drag per unit wetted surface in the laminar flow region. Interpretation of this fact by hydrodynamic theory indicates that the equilateral triangular arrangement of straight structural members results in lowest frictional drag between fluids and the packing in the laminar flow region.

The packing elements of the invention also provide a combination of stereo-geometrically arranged members and approximately evenly spaced interstices that guide liquid flow in a zig-zag pattern with approximately equal interstice-to-interstice distances in the path of liquid flow.

Packing elements of the invention have drip fingers and edges (end of a member projecting into a void) and were found to have a higher efficiency. Here, the hypothesized function of a finger is that liquid drips from a finger, when this finger is inclined with end downward. This dripping phenomenon results in better liquid distribution on an adjacent packing element which is just below the drip point of a finger, since an otherwise normally dry area now will have a chance to be wetted by the dripping liquid. In the prior art packing element, the number of drip points is small and the drip points are not evenly distributed in the space occupied by the packing element.

In the present invention, interstices and drip points are not only intentionally designed into a packing element, but also the numbers are increased to maximum with regard to the manufacturing technology to be used. Also, the design of the even distribution of interstices and drip points in the space occupied by the packing element assures the effectiveness of liquid mixing and gas-liquid contact at interstice/drip points.

In contrast to prior art packing element design, the width of a structural member of the packing elements should be the same as the width of the liquid rivulet which flow upon the structural member. Generally, the width of a structural member is from 0.078" to 0.276" (2 mm to 7 mm) depending upon the width of the local rivulet, which in turn depends upon the quality of liquid distribution and from 0.032" to 0.078" (0.79 mm to 2 mm) thick.

The minimization of inter-packing element void also contributes to the even distribution of interstices drip points in a packed bed and thereby increases the gas-liquid contact efficiency of the packed bed. A randomly packed bed of saucer-shaped packing elements of the invention has the least inter-packing element void when compared to the packed beds of spherical packing elements or cylindrical packing elements of various size ratio.

When the packing element is molded of a plastic material, a two-part molding die has significant manufacturing and economic advantages. The design of alternatively arranged members, i.e., as shown in FIG. 5—the top view of the new packing element, where no two members are on the same axially oriented plane, of the present invention enables the use of two-part injection molding die.

Figure 5:
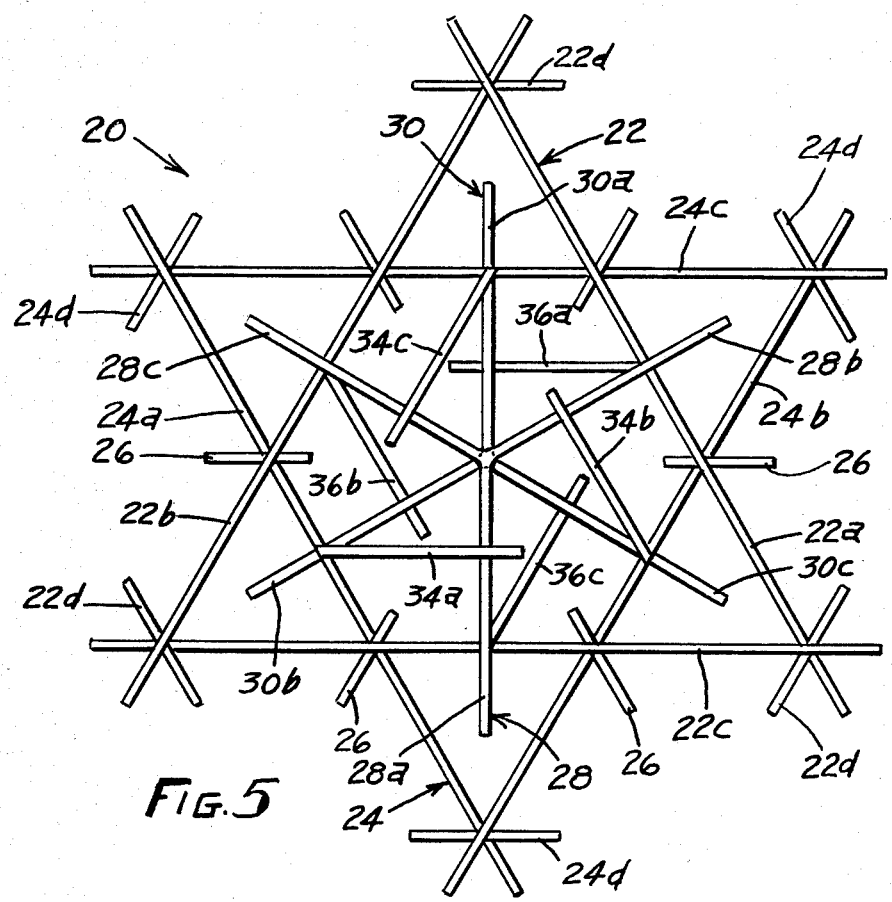
FIG. 5 is a top view of a packing element of the invention.
Figure 6:
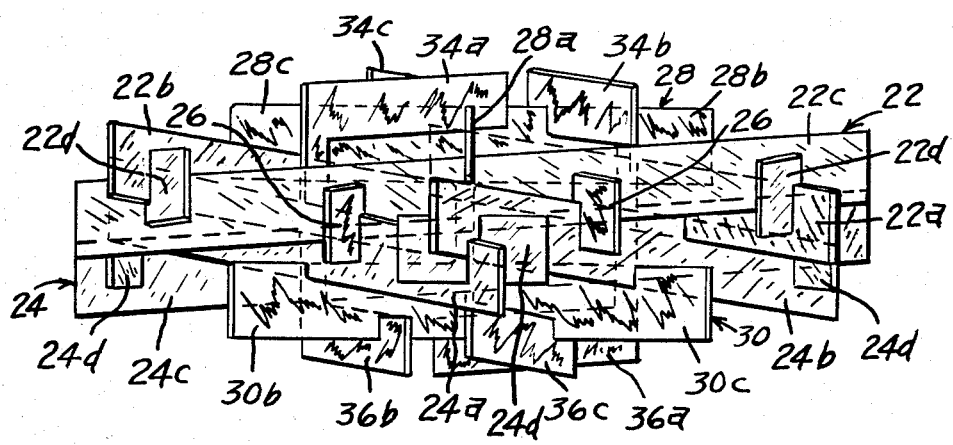
FIG. 6 is a side view of the packing element shown in FIG. 5.

Referring to FIGS. 5 and 6, there is shown a hollow or cellular six (6) pointed star and saucer-shaped packing element 20 with opposite open ends constructed of a pair of right and left hand hollow three (3) pointed star or equilateral triangular structure groups or units 22 and 24 angularly displaced 60° relative to each other about a central axis x and on opposite top or right hand and bottom or left hand sides of the packing element 20. The left and right hand triangular structures 22 and 24 are a mirror image of each other and are constructed similar to the triangular unit 10 shown in FIG. 4 and each comprises three inclined narrow structural side members 22a, 22b, and 22c, for unit 22 and 24a, 24b, and 24c, for unit 24. The structural side members are of substantially identical equal size and shape fixed to and cross one another at the apexes of each triangular structure group. The narrow inclined structural side member, 22a, 22b, 22c, 24a, 24b, and 24c, have upper and lower thin parallel edges inclined relative to the upper and lower inclined edges of an adjacent side member in each group and to a central or horizontal plane CP through the packing element.

In FIGS. 5 and 6, one can see that the structural side members 22a, 22b, and 22c of the triangular structure 22 are situated opposite, spaced parallel to and have inclined top and lower edges extending parallel to but spaced axially from the inclined edges of the respective structural side members 24a, 24b, and 24c, of the triangular structure 24.

At each of the apexes, two oppositely inclined structural side members have axially offset upper and lower end portions that cross one another and one member is upwardly inclined to an upper drip end thereof and the other extends inclined downwardly to a lower drip end thereof. At each of the cross-over points and apexes of the triangular structures 22 and 24 are short drip fingers or cross members 22d and 24d respectively which extend parallel to an opposite side member of the triangular structure and to opposite drip ends thereof.

Connecting the adjacent axially disposed triangular structures 22 and 24 together are a plurality of short structural tie members 26 with opposite drip ends and edges located in adjacent outer and intermediate cells, voids or interstices of the packing element 20. Each tie member 26 extends both axially between and radially from each cross over portion or point of adjacent structural side members of the triangular unit 22 and 24 and also parallel to a structural side member of each of the triangular units 22 and 24.

The packing element 20 also comprises a pair of Y-shape structures 28 and 30 situated on opposite outer saucer shape sides of the packing element. The Y-shape structure 28 has three (3) relatively thin, narrow and straight radial structural members or legs 28a, 28b, and 28c, equally angularly spaced 120° about and extending horizontally radially outwardly from one upper end of a central connector or hub 32 extending axially about the axis X and connecting the Y shape structures 28 and 30 together. Likewise, the Y-shaped structure 30 has three similar thin, narrow, and straight radial structural members 30a, 30b, and 30c, equally angularly spaced 120° about and extending horizontally radially outwardly from the opposite lower end of the central hub 32.

The Y shape structure 28 is situated on the top or right-hand side of the packing element 20 so that the three structural members 28a, 28b, and 28c, extend radially, cross over and are connected to the intermediate or mid-points or portions of the upper outer inclined edge of each of the structural side members 22a, 22b, and 22c, of the triangular structure 22.

Similarly, the Y-shaped structure 30 is situated on the bottom or left-hand side of the packing element 20 and oriented angularly 60° to the Y structure 28 so that the structural members 30a, 30b, and 30c, extend radially, cross over, and are connected to the intermediate or mid-points or portions of the lower outer edge of each side member 24a, 24b, and 24c of the triangular structure 24.

The horizontal radial members 28a, 28b, 28c, 30a, 30b, and 30c, of the interconnected Y-shape structures 28 and 30 are preferrably equally angularly spaced 60° apart and each extends radially from the axis X toward an apex and lies in an axial plane aligned with and passing through the axis X and one of the six (6) equally angularly spaced 60° apart apexes of the triangular structures 22 and 24.

Each of the straight radial structural members 28a, 28b, 28c, 30a, 30b, and 30c, extend beyond the cross over or mid-points of the side members to free drip ends and edges thereof each situated in an outer triangular shape interstice, void or cell with open ends adjacent thereto and an apex of one of the triangular units 22 or 24.

Additionally, the outer edges of the straight radial structure members 28a, 28b, 28c of Y-structure 28 on the right hand or top side of the packing element are interconnected by L-shaped members 34a, 34b, and 34c respectively to the mid points or portions of the inner edges of the structural side members 24a, 24b, and 24c, of the triangular unit 24 on the opposite lower or left hand side of the packing element 20. Likewise, the outer edges of the straight radial structural members 30a, 30b, and 30c, of Y-structure 30, on the lower or left-hand side of the packing element 20 are interconnected by L-shaped members 36a, 36b, and 36c respectively to the mid-points or portions of the structural side members 22a, 22b, and 22c of the triangular structure 22 on the opposite top or right-hand side of the packing element 20.

Each of the L-shaped structural members 34a, 34b, 34c, 36a, 36b, and 36c, have an outer inclined portion connected at its outer end to an axial or vertical portion extending axially to the inner edge of a structural side member of a triangular structure. The outer inclined portion including outer inclined edges thereon is inwardly inclined toward the central plane CP from an inner high point of the inner drip end thereof situated in the plane of each opposite side of the packing element 20 which also determines the axial length or height thereof.

The outer inclined portion of each generally L or angular shape structure member is connected at an inner end or edge portion to the outer edge portion of a straight radial structural member of the Y-shape structures 28 and 30 which it crosses and extends beyond to inner drip ends and edges each located in an adjacent inner triangular void, cell or insterstice of the packing element 20.

Also, it can be seen that the inclined portion of each L or angular shaped connector or member 34a, 34b, 34c, 36a, 36b, and 36c, is relatively thin, narrow, and straight, and extends generally parallel to one of the straight structural side members 22a, 22b, 22c, 24a, 24b, and 24c of the triangular structure 22 and 24. The outer lower drip edges of each L-shaped member extends axially through a void of the packing element from the outer end of the outer inclined edge to the mid-point or portion of the inner edge of a structural side member of the triangular structure on the opposite side of the packing element.

Another preferred embodiment of a packing element 40 of the invention is disclosed in FIGS. 7, 8, 9, and 10. The hollow packing element 40 is constructed in substantially the same fashion and of substantially the same structural elements as the packing element 20 disclosed and described hereinabove.

It differs in that it has a pair of equilateral or three pointed star shaped triangular structure groups or units 42 and 44, each comprised of three relatively thin, narrow and straight inclined structural side members 42a, 42b, 42c, which extend to but do not cross beyond apexes of the triangular structure 42 and 44a, 44b, and 44c, extending to but do not cross apexes of the triangular structure 44. The hollow three pointed star shape triangular structure 42 is a right hand version located on the top or right side of the packing element 40 whereas the hollow three pointed star shape triangular structure 44 is a left-hand version or mirror image of the triangular structure 42 and located on the opposite lower, bottom, or left side of the packing element 40. The triangular structure 42 and 44 are also angularly displaced 60° relative to each other about a central or vertical axis X and situated on opposite sides of a central or horizontal plane CP of the packing element 40. It also can be seen that the structural side member 42a, 42b, and 42c, are situated opposite, spaced, parallel to, and have inclined upper and lower edges extending parallel to but spaced axially from the inclined edges of the respective structural side member 44a, 44b, and 44c, of the triangular structure 44.

At each of the apexes the ends of two oppositely inclined structural side members are attached to one of the upper or lower edges of an outer annular rim or outer structural member R with a narrow outer central reinforcing rib portion enclosing the inner wider portion thereof. The ends of adjacent and oppositely inclined side members of each triangular structure are situated adjacent to and displaced axially or offset relative to each other. That is, one side member including upper and lower inclined edges, is inclined upwardly from a lower end situated adjacent a high end of the other adjacent downwardly inclined member including downwardly inclined upper and lower edges extending to an opposite lower end thereof. Thus, all structural side members of the triangular structures 42 and 44 are inclined relative to each and the central plane CP of the packing element 40. Situated between, connecting and axially spacing the triangular structures 42 and 44 are a plurality of short radial tie members 46 that are connected to and extend radially inwardly from the inner portions of the outer rim R. The tie members 46 are equally angularly spaced about the axis X and rim R and extend axially between and intersect the crossing edge portions of the inner edges of adjacent structural side members of the triangular units 42 and 44 and parallel to a structural side member of the triangular units 42 and 44. Each radial tie member 46 cross the intersection of the adjacent structural side member of the units 42 and 46 and extend to drip ends and edges each located in an adjacent intermediate void or interstice of the packer element 40.

A pair of axially spaced Y-shaped structural members 48 and 50 are also situated on opposite outer sides of the packing element 40, angularly displaced 60° relative to each other and axially spaced and connected by a central connector or hub 52 about the axis X.

The Y-shaped structure 48 has three (3) relatively thin, narrow and straight inclined radial structural members or legs 48a, 48b, and 48c, equally angularly spaced 120° about and extending radially outwardly or upwardly inclined from a recessed lower end of the central connector or hub 52 to free drip ends each located in an outer triangular void of the packing element 40.

Similarly the Y-shape structure 50 also has three (3) thin, narrow, and straight inclined radial structural members or legs 50a, 50b, and 50c, equally angularly spaced 120° about and extending radially and outwardly or downwardly inclined from the opposite recessed lower end of the central connector or hub 52 to free drip ends each located in an outer triangular void of the packing element 40. The three inclined structural members 48a, 48b, and 48c, of the Y-structure 48 are situated on the right or top side of the packing element 40, extend radially, cross over and are connected to the mid or intermediate points or portions of the upper outer edges of each of the structural side member 42a, 42b, and 42c, of the triangular structure 42.

On the bottom or left-hand side of the packing element 40 the structural members 50a, 50b, and 50c, of Y-shaped structure 50 extend radially, cross over, and are connected to the mid or intermediate points or portions of the lower outer edges of each of the structural side members 44a, 44b, and 44c, of the triangular structure 44.

The six (6) inclined radial members 48a, 48b, 48c, 50a, 50b, and 50c, of the interconnected Y-shaped structures 48 and 50 are preferably equally spaced 60° apart and each extends radially from the apex X toward and lies in an axial plane aligned with and passing through the axis X and one of the six equally angularly spaced 60° apart apexes of the triangular structures 42 and 44. Also, each of the six (6) inclined radial member of the Y-structures 48 and 50 cross-over and beyond the mid-point of a side of the triangular structures 42 and 44 to drip end and edges each located in and outer triangular void or interstice adjacent each of the six apexes of the triangular structure 42 and 44 of the packing element 40.

A number of L-shaped or angular structural members 54a, 54b, and 54c interconnect the outer inclined edge of each of the inclined straight radial members 48a, 48b, and 48c, of the Y structure 48 on the right hand or top side of packing element 40 to the mid-point or portion of the inner edge of the structural side member 44a, 44b, and 44c, of the triangular unit 44 on the lower of left hand side of the element 40.

Likewise L-shaped or angular structural members 56a, 56b, and 56c, interconnect the outer inclined edge of each inclined straight radial member 50a, 50b, and 50c of the Y-structure 50 on the opposite left-hand or bottom side of the packing element 40 to the mid-points or portions of the inner edge of the structure side members 42a, 42b, and 42c, of triangular structure 42 on the upper or top side of the element 40.

Preferably, each of the L-shaped or angular structural members have an outer relatively thin, straight and narrow horizontal portion connected at its outer end to an axial or vertical portion extending axially to the inner edge of a structural side member of the opposite triangular structure 42 or 44. The outer horizontal edges of the horizontal portion of the three (3) L-shape members on each side of the packing element are situated in the same plane parallel to the central plane CP. Thus, the distance between the planes of the outer horizontal edges determine the axial height or length of the packing element 40 and the outer diameter of outer rim R determines the maximum diameter, transverse or diametrical dimension thereof.

Thus, the hollow cellular packing elements 20 and 40 which are preferably injection molded in a split mold are made of suitable plastic material and constructed in such a way as to provide the desired strength, crossing contact surface area, uniformly distributed structual members, voids or cells and drip fingers and edges therein.

However, it is obvious that the packing elements of the invention could be fabricated, or molded of various metals, ceramics and plastic materials, but are preferably precision injection molded of a suitable thermoplastic material such as polyvinyl chloride, polypropylene, polystyrene, nylon, polytetrofloreythlene and halogenated polyolefins. Obviously, the material selected depends upon the environment and its resistance to the materials which it comes in contact with in that particular environment.

The packing elements of the invention may be made in various sizes and shapes but preferably have a generally saucer shape opposite sides or peripheral outline and a maximum transverse diametrical dimension, width or diameter, measured along a vertical plane passing through the axis X and two apexes of the triangular structure, greater than its axial length or height beween the opposite sides thereof. The ratio of axial length to the maximum transverse diametrical dimension will in most instances range from 1:1. to 1:6 and preferably about 1:3, but not greater than 1:10 whereby randomly dumped packing elements of the invention have the tendency to self-orient themselves horizontally within the tower chamber.

Typical packing elements of the invention have a maximum transverse dimension of approximately 2¼" (5.7 cm) and 3¾" (9.5 cm) and an axial length or height of approximately ¾" (1.9 cm) and 1¼" (3.2 cm).

Figure 7:
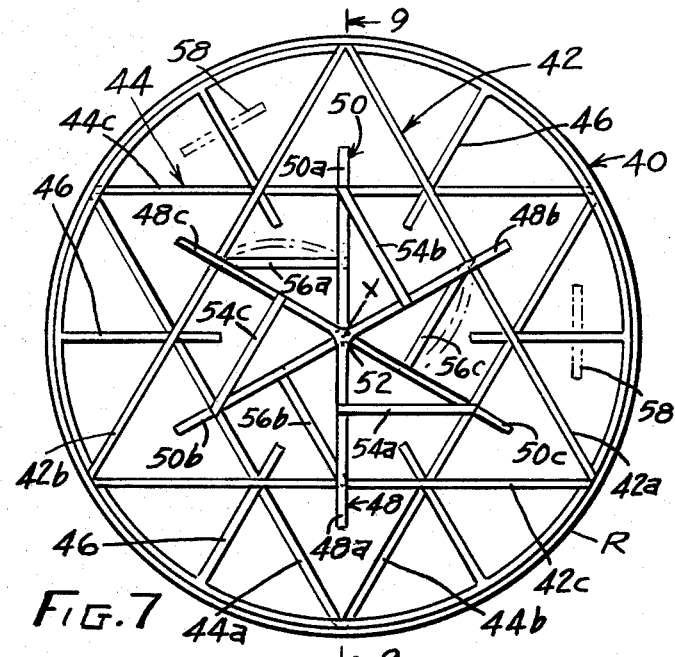
FIG. 7 is a top view of another packing element of the invention.
Figure 9:
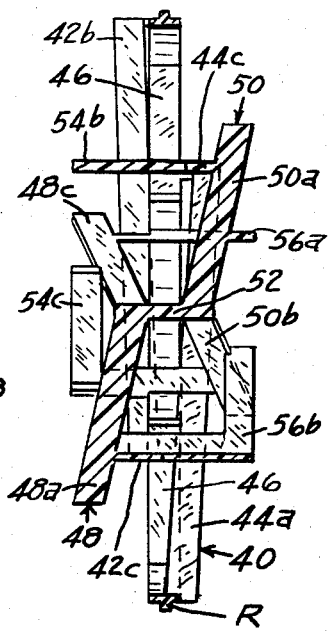
FIG. 9 is a vertical sectional view through the packing element taken on line 9—9 of FIG. 7.
Figure 8:
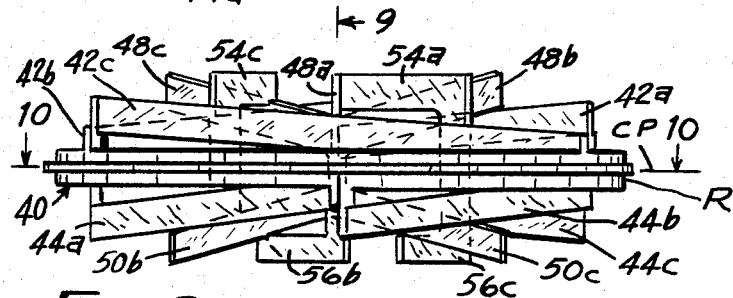
FIG. 8 is a side view of the packing element shown in FIG. 7.
Figure 10:
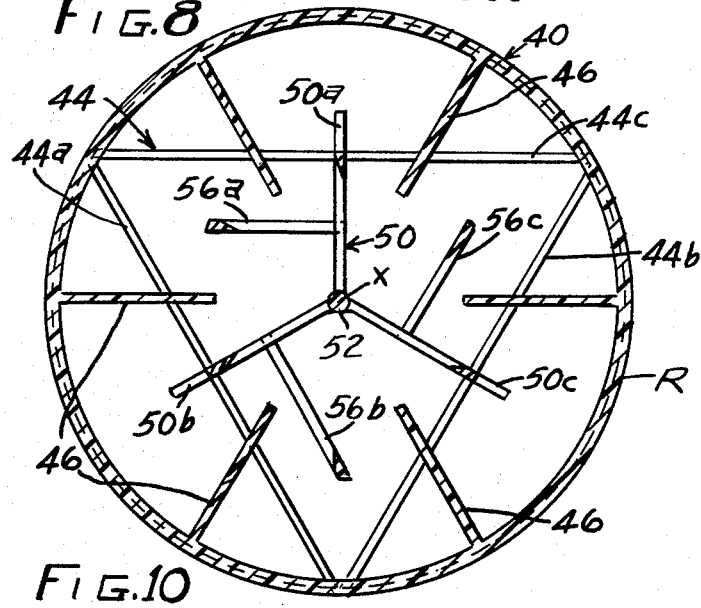
FIG. 10 is a horizontal sectional view through the packing element taken on line 10—10 of FIG. 8.

Alternatively, the L-shape or angular shape structural members 54a, 54b, 54c, 56a, 56b and 56c may have an arcuate curved outer portion as shown in phantom lines in FIGS. 7 and 10 which tends to create secondary motion to fluid flow over the surfaces thereof. Additional drip fingers 58 and edges can also be provided by attaching them to the radial members 46 as shown in phantom lines in FIG. 7.

When the packing elements of the invention are oriented horizontally in a bed thereof the outer portions of the L-shape members contact one another and thus prevent nesting of adjacent packing elements randomly dumped or stacked in the bed.

Also, the horizontally oriented packing elements of the invention provide uniformly distributed cells or voids and structural members with the majority of the surface area oriented vertical and inclined in various directions relative to the horizontal plane CP and axis X.

The outer annular rim R which by example is shown to be circular may have a hexagonal or other polygonal shape with side members extending between the apexes and angularly to the side members of the triangular structures.

In a series of comparison tests, tower packings containing the packing elements made according to the invention were found to be more efficient and outperform comparable packings of such well known and highly efficient plastic packing elements of various sizes and designs sold under the registered trademarks INTALOX SADDLE and PALL RING by the Chemical Process Products Division of Norton Company, Tallmadge, Ohio.

The following data in Table I indicates results obtained from a typical mass transfer operation between a gas phase (G) containing 1% $CO_2$ in air flowing at a rate of 900 lbs/ft²/hr and a liquid phase (L) at a temperature of 75° F. containing 4% NaOH aqueous solution of which 25% is carbonated and flowing at a rate of 10,000 lbs/ft²/hr.

Comparing the data in Table I, it can be seen that, in terms of $\Delta P$ or $K_Ga$, the packings of randomly dumped 2" and 3½" size plastic packing elements of the invention performed better than packings of randomly dumped plastic Pall Rings and plastic Intalox Saddle packing elements of comparable 2", 3" and 3½" sizes.

The superior performance was attained in spite of the less than favorable distribution of the liquid by the particular liquid distributor above the bed of packing elements. Thus, the implication is that the $K_Ga$ value would be slightly higher with a better and more uniformly distributed liquid.

Nevertheless, the packing elements of the invention are considered to be well within the criterion for attaining better packing performance which is either a lower $\Delta L$ or higher $K_Ga$ while holding $K_Ga$ or constant, respectively.

TABLE I

| RANDOMLY DUMPED PACKING OF PLASTIC ELEMENTS | $\Delta P/\Delta L$ in.H$_2$O/ft, at G = 900 lb/ft²-lb, L = 10000 lb/ft²-hr | $K_Ga$, lb moles/hr-ft²-atm, at 25% Carbonation G = 900 lb/ft²-hr, L = 10000 lb/ft²-hr | Packing Factor ($F_p$) |
|---|---|---|---|
| 1.5" Pall Ring (4 spoke) | .23 | 2.85 | 34.26 |
| 2" Pall Ring (4 spoke) | .11 | 1.75 | 26.4 |
| 2" Pall Ring (6 spoke) | .135 | 2.50 | 24.6 |
| 3½" Pall Ring (6 spoke) | .071 | 1.65 | 19.60 |
| 1" Intalox ® Saddle | .28 | 3.55 | 46.5 |
| 2" Intalox ® Saddle | .14 | 2.25 | 25.6 |
| 3" Intalox ® Saddle | .080 | 1.48 | 16.7 |

TABLE I-continued

| RANDOMLY DUMPED PACKING OF PLASTIC ELEMENTS | ΔP/ΔL in.H₂O/ft, at G = 900 lb/ft²-lb, L = 10000 lb/ft²-hr | K_Ga, lb moles/hr-ft²-atm, at 25% Carbonation G = 900 lb/ft²-hr, L = 10000 lb/ft²-hr | Packing Factor (F_p) |
|---|---|---|---|
| 2" of the invention | .080 | 2.66 | 21.40 |
| 3½" of the invention | .037 | 2.33 | 14.51 |

NOTE, that ΔP/ΔL measured for air-water system represents the pressure drop (ΔP) in inches of water per ft. of length or height (ΔL) of the bed of packing elements;

$K_Ga$ measured with possibly bad primary liquid distribution represents the mass transfer coefficient of bed of packing elements;

and the packing factor ($F_p$) represents the accepted index of the gas and liquid handling capacity of a bed of the particular packing elements.

It is to be understood that the invention is not limited to the specific embodiments disclosed hereinabove by example, that various modification and changes may be made in the disclosed embodiments without departing from the spirit of the invention and that the invention includes all modifications and equivalents thereof falling within the scope of the appended claims.

I claim:

1. A packing element for fluid-fluid contact apparatus comprising:
    a first hollow triangular shape structure on one side of the packing element and a central plane thereof extending perpendicular to a central axis of the packing element having
        three relatively thin narrow elongated inclined structural side members inclined relative to each other and the central plane, extending around the central axis and between apexes of the first triangular structure;
    a second hollow triangular shape structure on an opposite side of the packing element and the central plane and angularly displaced about the central axis relative to the first triangular structure and having
        three relatively thin narrow elongated inclined structural side members inclined relative to each other, the central plane and the inclined side members of the first triangular structure and extending around the central axis between apexes thereof and crossing the inclined side members of the first triangular structure; and
    a pair of interconnected generally Y-shape structures each situated on one side of the central plane and the packing element, adjacent each of the first and second triangular structures and each including
        a central hub about the central axis, and
        three relatively thin narrow elongated radial structural members angularly displaced relative to each other about the central axis, extending radially from the central hub, connected to and crossing outer inclined edges of the three structural side members of each adjacent one of the first and second triangular structures to free drip ends thereof each situated within an open ended cell adjacent each of the apexes.

2. A packing element according to claim 1 wherein the pair of interconnected Y-shape structures adjacent the first and second triangular structures are angularly displaced at least 60° relative to one another about the central axis.

3. A packing element according to claim 1 further comprising:
    a plurality of relatively thin narrow and short structural tie members extending radially from and connecting adjacent crossing portions of the inclined structural side members of the first and second triangular structures, and each having
        opposite drip ends each situated within an adjacent cell of the packing element.

4. A packing element according to claim 3 wherein the crossing portions of the inclined structural side members of the triangular structures and the short structural tie members interconnect one another at intersections thereof, intersect one another at an angle, are axially offset relative to and overlap one another by a predetermined axial amount at each intersection of the structural members.

5. A packing element according to claim 1 wherein the three inclined structural side members of each of the first and second triangular structures cross one another at each of the apexes and extend to drip ends thereof circumferentially and axially displaced relative to each other.

6. A packing element according to claim 4 further comprising:
    a drip finger extending to a drip end thereof from each of the apexes, parallel to an inclined structural side member and connecting crossing portions of the inclined structural side members of the triangular structure.

7. A packing element according to claim 1 wherein the packing element has a predetermined axial length and a maximum transverse diametrical dimension in a ratio of from 1:1 to 1:10 whereby the packing element has the tendency to self orient itself and the central plane thereof horizontaly when randomly dumped into a chamber of a fluid-fluid contact apparatus.

8. A packing element according to claim 1 further comprising:
    an angular shape structural member connecting each of the radial structural members of the Y-shape structure on each side of the packing element to each of the inclined structural side members of the first and second triangular structure on the opposite side of the packing.

9. A packing element according to claim 8 wherein each angular shape structural member comprises:
    a relatively thin and narrow outer portion connected at an inner end thereof to the outer edge of a radial structural member of a Y shape structure and extending to an opposite outer end thereof, and
    a relatively thin and narrow axial portion connected to and extending axially from the opposite outer end of the outer portion and connected to an inner edge portion of an inclined structural side member of the triangular structure on the opposite side of the packing element.

10. A packing element according to claim 9 wherein the outer portion and its outer edge of each angular shape structural member is inclined inwardly toward the central plane from the inner end to its opposite outer end.

11. A packing element according to claim 9 wherein the outer portion of each angular shape structural member has
an arcuately curved shape and arcuately curved opposite sides extending between the inner and opposite outer ends thereof.

12. A packing element according to claim 1 wherein the first and second triangular structures are
equilateral triangular structures and each inclined structural side member of the first triangular structure crosses and is connected to crossing inner edge portions of two adjacent inclined structural side members of the second triangular structure,
the apexes of the first and second triangular structures are equally angularly spaced about the axis, the radial structural members of the Y-shape structure are equally angularly spaced about the central axis and each lies in an axial plane aligned with and extending through the central axis and an apex of the triangular structures and out of axial alignment with one another and each of the inclined structural side members of the triangular structures whereby
no two structural members of the packing element are situated in the same axial plane, the structural members and cells there between are uniformly and equally distributed about the axis and the packing element.

13. A packing element according to claim 1 wherein each of the radial structural members of each of the Y-shape structures is inclined outwardly from a recessed end of the central hub to its outer end.

14. A packing element according to claim 1 wherein each outer side of the packing element has an approximately saucer shape outer peripheral outline.

15. A packing element according to claim 1 wherein all of the inclined structural side members of the triangular structure have thin inclined edges inclined at the same angle relative to the central plane and narrow sides of from 0.078" to 0.276" (2 mm to 7 mm) wide in the axial direction.

16. A packing element according to claim 1 wherein the packing element is molded of a thermoplastic material selected from a group consisting of polypropylene, polystyrene, polyvinyl chloride, nylon polytetrafluoro ethylene and halogenated polyolefins.

17. A packing element according to claim 1 further comprising:
an outer rim extending around and connected at each of the apexes to the end of the inclined structural side members of the first and second triangular structures.

18. A packing element according to claim 17 further comprising:
a plurality of relatively thin narrow and short structural tie members connected to and extending radially inwardly from the outer rim, connecting and axially spacing adjacent crossing portions of the inclined structural side members of the first and second triangular structures and crossing in between to drip ends situated within adjacent cells of the packing element.

19. A packing element according to claim 18 further comprising:
a relatively thin narrow and short finger extending from each opposite side of each of the short structural tie members connected to and extending from the outer rim, to a drip end situated in an outer cell of the packing element.

* * * * *

UNITED STATES PATENT AND TRADEMARK OFFICE
CERTIFICATE OF CORRECTION

PATENT NO. : 4,511,519

DATED : April 16, 1985

INVENTOR(S) : Min A. Hsia

It is certified that error appears in the above-identified patent and that said Letters Patent is hereby corrected as shown below:

Claim 6 as it appears in the printed patent should be dependent on Claim 5.

Signed and Sealed this

Seventeenth Day of February, 1987

Attest:

DONALD J. QUIGG

Attesting Officer

Commissioner of Patents and Trademarks